US006241930B1

(12) United States Patent
Harrison

(10) Patent No.: US 6,241,930 B1
(45) Date of Patent: *Jun. 5, 2001

(54) METHOD OF CONSTRUCTING A GARMENT WITH A GRAPHICAL DESIGN THEREON

(75) Inventor: Don Harrison, Houston, TX (US)

(73) Assignee: Ubertech Texas, Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/927,860

(22) Filed: Sep. 11, 1997

Related U.S. Application Data

(63) Continuation of application No. 08/564,855, filed on Nov. 30, 1995, now abandoned.

(51) Int. Cl.[7] .............................. B29C 45/14; B29C 45/16
(52) U.S. Cl. ........................ 264/251; 264/257; 264/260; 264/328.6; 264/328.8
(58) Field of Search ........................... 2/243.1, 244, 246, 2/115; 40/586, 616; 264/251, 257, 260, 259, 297.1, 297.2, 297.8, 328.1, 328.2, 328.4, 328.5, 328.6, 328.8, 328.17, 328.18, 328.19, 328.16

(56) References Cited

U.S. PATENT DOCUMENTS

| 2,291,545 | * | 7/1942 | Ganz et al. . |
| 2,485,323 | * | 10/1949 | Schwartz . |
| 2,766,484 | * | 10/1956 | Sanderson . |
| 2,926,439 | | 3/1960 | Holick . |

(List continued on next page.)

FOREIGN PATENT DOCUMENTS

| 1319234 | 6/1993 | (CA) . |
| 23 56 004 | 11/1973 | (DE) . |

(List continued on next page.)

OTHER PUBLICATIONS

Hays, W. R., "A New Liquid Processing System for Making Silicone Rubber Parts," Proceedings of the International Rubber Conference 1979, pp. 821–827, Venice, Italy, Oct. 3–6, 1979.

(List continued on next page.)

Primary Examiner—Jill L. Heitbrink
(74) Attorney, Agent, or Firm—Madan, Mossman & Sriram, P.C.

(57) ABSTRACT

A method of attaching an applique to a garment includes the providing of die press member and a backing plate press member. Die cavities are formed on one face of the injection molding die press member, each preferably of a uniform thickness of about 1.0–3.5 mm. The die cavities are open for communicating with a garment surface. The open area corresponds in size and shape with final design elements to be affixed to the garment. The garment is placed in-between the die and a backing plate member. The injection molding die member places its open cavity portion against the garment. The backing plate press member and die press member squeeze the garment therebetween to form a seal at the peripheral surface. The die member and an injection moldable silicone polymer are heated to a temperature of about 200–250 degrees Fahrenheit (200° F.–250° F.). The silicone polymer is then injected into the die until the design cavity is filled and the garment is also impregnated with silicone at the die cavity open area. The silicone polymer is allowed to continuously impregnate the garment within the periphery of the die cavities and from the outside surface to a position at least near the inside surface, preferably completely through the garment.

7 Claims, 3 Drawing Sheets

U.S. PATENT DOCUMENTS

| | | |
|---|---|---|
| 3,055,133 | 9/1962 | Anderson . |
| 3,193,435 | 7/1965 | Schafer . |
| 3,256,626 | 6/1966 | Stoffel . |
| 3,442,736 | 5/1969 | Duns . |
| 3,650,647 * | 3/1972 | Jacobs et al. . |
| 3,654,062 | 4/1972 | Loew . |
| 3,669,415 | 6/1972 | Nielander . |
| 3,705,935 | 12/1972 | Francis et al. . |
| 3,800,368 * | 4/1974 | Simon .......................... 264/257 |
| 3,861,955 | 1/1975 | Lemelson . |
| 3,890,679 | 6/1975 | Simon . |
| 4,120,053 * | 10/1978 | Nemirofsky ........................ 2/115 |
| 4,264,386 | 4/1981 | Sears et al. . |
| 4,264,666 * | 4/1981 | Hix ................................. 40/586 X |
| 4,292,263 | 9/1981 | Hanrahan et al. . |
| 4,310,927 * | 1/1982 | DeBose ............................. 2/115 |
| 4,370,115 | 1/1983 | Miura . |
| 4,481,160 | 11/1984 | Bree . |
| 4,484,360 | 11/1984 | Leighton et al. . |
| 4,484,361 | 11/1984 | Leighton et al. . |
| 4,493,865 | 1/1985 | Kuhlmann et al. . |
| 4,494,247 | 1/1985 | Kelly . |
| 4,530,874 | 7/1985 | Hendrix et al. . |
| 4,573,216 | 3/1986 | Wortberg . |
| 4,631,210 | 12/1986 | McGee et al. . |
| 4,645,629 | 2/1987 | Stern . |
| 4,686,766 | 8/1987 | Dubbs et al. . |
| 4,693,769 | 9/1987 | Fritz et al. . |
| 4,709,443 | 12/1987 | Bigley . |
| 4,710,145 | 12/1987 | Hall Vandis . |
| 4,735,753 * | 4/1988 | Ackermann ....................... 264/445 |
| 4,772,503 * | 9/1988 | Donsky ............................ 2/115 X |
| 4,784,814 * | 11/1988 | Diethelm et al. ............ 264/328.16 |
| 4,806,391 | 2/1989 | Shorin . |
| 4,810,559 | 3/1989 | Fortier et al. . |
| 4,815,149 | 3/1989 | Erhardt et al. . |
| 4,818,829 | 4/1989 | Nopper et al. . |
| 4,837,864 | 6/1989 | Thill . |
| 4,838,965 | 6/1989 | Bussard . |
| 4,849,145 | 7/1989 | Hirsch . |
| 4,876,805 | 10/1989 | Peoples . |
| 4,910,886 | 3/1990 | Sullivan et al. . |
| 4,922,929 | 5/1990 | DeJournett . |
| 4,923,848 | 5/1990 | Akada et al. . |
| 4,926,502 | 5/1990 | Miyamura . |
| 4,933,120 | 6/1990 | D'Amato et al. . |
| 4,956,040 | 9/1990 | Fry . |
| 4,963,208 | 10/1990 | Muncy et al. . |
| 4,982,447 | 1/1991 | Henson . |
| 4,987,613 | 1/1991 | Loverdi et al. . |
| 5,005,219 | 4/1991 | Diaz . |
| 5,014,354 | 5/1991 | Dumont . |
| 5,014,358 | 5/1991 | Matumori . |
| 5,033,939 | 7/1991 | Brasel . |
| 5,048,123 | 9/1991 | Monson . |
| 5,065,475 | 11/1991 | Watt . |
| 5,073,222 | 12/1991 | Fry . |
| 5,075,899 | 12/1991 | Funahashi et al. . |
| 5,087,193 | 2/1992 | Herbert, Jr. . |
| 5,093,067 | 3/1992 | Gibson . |
| 5,101,580 | 4/1992 | Lyden . |
| 5,139,566 | 8/1992 | Zimmerman . |
| 5,146,628 | 9/1992 | Hermann et al. . |
| 5,151,239 | 9/1992 | King, Jr. . |
| 5,153,007 | 10/1992 | Watkins . |
| 5,168,576 | 12/1992 | Krent et al. . |
| 5,173,968 | 12/1992 | Fox . |
| 5,188,981 | 2/1993 | Stiles et al. . |
| 5,200,263 | 4/1993 | Gould et al. . |
| 5,204,042 * | 4/1993 | James et al. ........................ 264/257 |
| 5,205,892 | 4/1993 | Gagliani et al. . |
| 5,210,877 | 5/1993 | Newman . |
| 5,229,144 | 7/1993 | Kuntz . |
| 5,236,324 | 8/1993 | Konieczny et al. . |
| 5,241,919 | 9/1993 | LaGreca . |
| 5,266,259 * | 11/1993 | Harrison et al. ............... 264/328.16 |
| 5,281,499 | 1/1994 | Bussard . |
| 5,296,182 | 3/1994 | Thary . |
| 5,304,547 | 4/1994 | Mentink et al. . |
| 5,309,840 | 5/1994 | Takamura et al. . |
| 5,314,767 | 5/1994 | Bussard . |
| 5,316,820 | 5/1994 | Harpell et al. . |
| 5,328,652 | 7/1994 | Thomson . |
| 5,337,418 | 8/1994 | Kato et al. . |
| 5,362,349 | 11/1994 | Zoller . |
| 5,364,387 | 11/1994 | Sweeney . |
| 5,364,584 * | 11/1994 | Imanara et al. ..................... 264/257 |
| 5,368,930 | 11/1994 | Samples . |
| 5,398,345 | 3/1995 | Kenneth et al. . |
| 5,405,312 | 4/1995 | Jacobs . |
| 5,418,980 | 5/1995 | Kelly . |
| 5,419,475 | 5/1995 | Naritomi . |
| 5,423,087 | 6/1995 | Krent et al. . |
| 5,435,007 | 7/1995 | Kalvestran et al. . |
| 5,455,129 | 10/1995 | Bussard . |
| 5,460,873 | 10/1995 | Ogawa et al. . |
| 5,487,861 | 1/1996 | Reeder et al. . |
| 5,494,621 | 2/1996 | Sugisaki et al. . |
| 5,510,911 | 4/1996 | Sharpe et al. . |
| 5,542,171 | 8/1996 | Juskey et al. . |
| 5,545,128 | 8/1996 | Hayes et al. . |
| 5,551,082 | 9/1996 | Stewart et al. . |
| 5,885,504 * | 3/1999 | David et al. .................... 264/328.16 |

FOREIGN PATENT DOCUMENTS

| | | |
|---|---|---|
| 23 26 971 B2 | 3/1977 | (DE) . |
| 28 27 149 A1 | 1/1979 | (DE) . |
| 85 33 472 | 3/1986 | (DE) . |
| 39 38 966 A1 | 5/1991 | (DE) . |
| 41 32 476 A1 | 4/1993 | (DE) . |
| 2717739 | 9/1995 | (FR) . |
| 2 047 126 | 11/1980 | (GB) . |
| 2 241 191 | 8/1991 | (GB) . |
| 6-158527 | 6/1994 | (JP) . |
| WO 91/10007 | 7/1991 | (WO) . |
| WO 91/12365 | 8/1991 | (WO) . |
| WO 96/24490 | 8/1996 | (WO) . |

OTHER PUBLICATIONS

Hegele, K., "Eight–Cavity Injection Moulds for Manufacturing Bellows of Silicone Rubber," Kunstsoffe 74 (1984) 12, pp. 714–715 (Translation provided).

Romig, C. A., "Automatic Preparation of Silicone–Rubber Parts," *GAK* Aug. 1995—Issue 38, pp. 408–409 (Translation provided).

Weise, G., "HTV Liquid Silicone Rubber for the Production of Form Parts in the Injection–Molding Process—an Economic Alternative," *German Rubber Days*, Jun. 13–16, 1983 (Translation provided).

* cited by examiner

METHOD OF CONSTRUCTING A GARMENT WITH A GRAPHICAL DESIGN THEREON

This is a continuation of application Ser. No. 08/564,855, filed Nov. 30, 1995, now abandoned.

BACKGROUND OF THE INVENTION

1. Field of the Invention

The present invention relates to an improved method of manufacturing a garment with an artistic or graphical design elements thereon, such as art work, logos, printed matter and the like. More particularly, the present invention relates to an improved method for preparing and attaching graphical design elements to a desired outer surface of a garment wherein the design includes three dimensional polymer elements that are injection molded to the garment by placing the garment in-between die members, one of which has an open die cavity area that engages the garment surface during application of the polymer to define the shape of the three dimensional elements, the design material being an injection moldable polymer, such as silicone polymer, that is forced into the die cavity, to the selected surface of the garment and into a substantial portion of the garment fabric pores so as to impregnate the garment in-between its inner and outer surfaces so as to form an attachment.

2. General Background

There are many methods presently in use for attaching artistic matter, printed matter, designs, logos, and the like to clothing. One common method of attaching a design element to an article of clothing is simply sewing a design element of fabric, felt, wool, or plastic. Another method of attaching a design element to an article of clothing is known as silk-screening. Silk-screening or silk-screen printing is a process of printing a flat color design through a piece of silk. The silk is tightly stretched on a wooden frame and a design is transferred to the silk. The parts of the design not to be printed are stopped out with a resin medium. Ink is pushed through the open mesh of the design area with a rubber edge squeegee. Only one color can be printed at a time using this method.

Many patents have issued that relate to the transfer of design elements to an article of clothing. An example of an early patent that discusses the attachment of insignia or appliques to clothing is the Holick patent 2,926,439 entitled "PROOF PLASTIC INSIGNIA AND NAME PLATE HOLDER-COVER".

The application of pictures to a garment is discussed in U.S. Pat. No. 3,055,133 entitled "JACKET WITH PICTURE POCKETS" issued to Kenneth Anderson. The Anderson patent discloses a vest like jacket having rectangular pockets that are clear so that when photographs are placed in a pocket, they can be seen through the clear plastic material. The clear pockets are formed by a plastic material sewed upon the jacket and divided into individual pockets by cross-sewing.

A doll figure that has appliques is disclosed in the Vandis patent 4,710,145.

The Erhardt et al. patent 4,815,149 entitled "FABRIC CLOTHING INCLUDING A THREE DIMENSIONAL PATTERN" shows an article of apparel such as a T-shirt that includes multiple fabric layers. The T-shirts includes a fabric layer upon which is attached a three dimensional molded article providing a three dimensional relief pattern on the front part of the T-shirt. The three dimensional molded part includes a flat base disk and raised relief parts with the disk being attached to the T-shirt fabric leaving a hollow area in-between the fabric and the raised parts.

An article of clothing to which a three dimensional applique has been applied to provide a decorative effect is disclosed in U.S. Pat. No. 4,837,864 issued to Thill. The Thill patent provides an applique that is of a flexible non-cloth material such as vinyl, various plastics or rubber which is attached to the front of panel of a T-shirt or sweater. The attachment is accomplished either through sewing or other positive connectors. The three dimensional applique is formed through various molding processes and the shirt or sweater may be cut to receive same.

The Akada et al. patent 4,923,848 relates to image formation on any selected kind of objective body. The objective body is discussed as being cards, clothes, papers, and transparent sheets. An example of a garment having a decorative applique is seen in the Diaz patent 5,005,219. An image is manufactured directly on a garment, such as by silk-screening. Chenille is sewn about the border of the image, thereby creating a shape with a chenille outline and an interior image. The decorative shapes are said to be letters, numbers, mascots, characters or symbols.

Another patent that discusses the application of an applique to clothing is the LaGreca patent 5,241,919. In the LeGreca patent there is disclosed an applique design produced on a garment or other fabric article by providing a chenille material having a fabric base and a plurality of cut or looped threads extending from an upper surface of a fabric base and applying a flexible backing material to a lower surface of the chenille material. The chenille material is cut to form edges having an outline of a desired design and disposed over a garment or fabric base. A polymer film is overlaid on the upper surface of the chenille material and a design is stitched over the film to the chenille material and a garment or fabric base. The stitching comprises closely spaced thread which covers and compresses portions of the film and chenille material. The film provides a barrier layer to prevent the thread loops from extending between the closely spaced thread of the stitching. The film is removed from the unstitched portions of the upper surface of the chenille material whereby the desired design is formed by the stitched and unstitched portions of the chenille material.

An example of a recent patent that relates to the display of art on a T-shirt or other textile product is U.S. Pat. No. 4,838,965 issued to Janice Bussard and entitled "HOLOGRAPHIC ART APPLIED TO T-SHIRTS OR OTHER TEXTILE PRODUCTS". The Bussard '965 patent discloses a hologram being adhered to a textile fabric by means of a silk screen printing ink while at the same time printing a graphic on the textile; the ink embedding the hologram edges therein and the ink containing an ingredient to bond with the hologram.

Another Bussard patent is U.S. Pat. No. 5,314,767 entitled "HOLOGRAPHIC PRODUCTS WITH IMPROVED SEALS". The '767 patent discloses an improved process for cutting and simultaneously sealing the cut edges of holographic materials comprising cutting with a hot cutting tool. Suitable cutting tools include a steel rule die, a hot tipped cutter, and a laser. The resulting product can be attached easily to a substrate and will resist delaminations even when attached to a substrate such as a textile material that will be subjected to ordinary washing and drying.

The Fry patents 4,956,040 and 5,073,222 relate to methods of adhering design elements to textile wearing apparel. Each of these patents discloses a method for adhering holograms to textile wearing apparel involving the steps of laminating a precut hologram between a clear polyester coating and an adhesive scrim backing to envelop the hologram and protect it from moisture and scuffing, cutting margins away from the laminated hologram to form an enveloped hologram and applying the enveloped hologram to wearing apparel at a temperature of between approximately two hundred seventy degrees and three hundred degrees Fahrenheit (270° F.–300° F.) under a pressure of approximately thirty to fifty (30 to 50) psi for a period of approximately eight to fifteen (8 to 15) seconds. A hologram becomes firmly adhered to the wearing apparel and remains impervious to moisture after repeated machine washing and drying cycles.

Recent patents that disclose the concept of an aperture garment having an envelope structure or pocket for displaying an article are the Fox patent 5,173,968 and the Kenneth et al. patent 5,398,345. The Fox '968 patent discloses an article constituted of pieces of self-adhesive pliable plastic which form a well sealed enveloping structure with may be manually unsealed and opened for the insertion of decorative or information conveying material and then manually closed again and well re-sealed at least one piece of plastic being transparent then at least one piece being selected so as to permit viewing of decorative information conveying material in the enveloping structure.

The Kenneth '345 patent discloses a combination aperture garment product and object adapted for securement in the pocket, where the pocket is attached to the garment by seams and has apertures therein. The object, which may be a teddy bear having appendages, is adapted to be removably secured in the pocket so that the appendages extend outside of the pocket through the apertures and are visible when positioned in the pocket. The apertures are arranged through the pocket panel spaced apart from the seams. The garment may have two dimensional graphic indicia arranged on it and the three dimensional object, when secured in the pocket, forms a part of the graphic indicia.

SUMMARY OF THE INVENTION

The present invention provides an improved method of attaching a design element or graphical element or elements to a desired article of clothing. The method of the present invention provides a die structure that includes a first die member having a design element shaped die cavity on one face. The die is preferably an injection molding-type die. The die cavity can include a number of different cavities such as multiple letter shaped cavities (see the U.S.A. design elements shown in the drawings, for example.)

The design cavity has a thickness of between about 1.0–3.5 mm and includes a first die surface area that occupies a plane and a peripheral surface that forms an angle of about ninety degrees (90°) with the first surface and with the plane. The die cavity area communicates with the garment and is held tightly against the garment by pressing against a second die member that is placed on the underside of the surface to which the transfer will be made. The two die members tightly grip the subject garment therebetween. Thus, the garment is held in a press-like fashion in-between the injection molding die member and the second die member that functions as a backing plate.

The injection molding die member is faced against the outside surface of the garment that is the surface that will display the final applique. The backing plate member faces the inside surface of the garment and is positioned opposite the die member during use. The die member and backing plate member are forced together until the garment is squeezed sufficiently therebetween to form a seal at the peripheral surface.

The liquid silicone polymer is pumped separately from the two containers to a manifold at the top of a static mixer tube. Silicone polymer components are blended in the static mixer. The two silicone rubber components travel through and are blended by the static mixer elements into the water cooled (jacketed) injection barrel of the press. The barrel auger rotates and fills to a set point determining the size of the particular shot. After filling, the auger is pushed forward by hydraulics which are valved to control shot speed and shot pressure of the material pushed through the cooled injection nozzle into the heated injection mold.

Upon completion of the injection cycle, a cure cycle begins. The cycle time will vary dependent upon the mass of the parts used for the die and the temperature of the mold. Upon completion of the cure cycle, the press/mold opens and the molded parts can be removed. The die member is heated to a temperature of about 200–250 degrees Fahrenheit (200° F.–250° F.). An injectable silicone polymer or silicone rubber is also heated within the die member to a temperature of about 200–250 degrees Fahrenheit (200° F.–250° F.). The heated silicone fills the die cavity and the garment is impregnated with the silicone at the die cavity open area.

The silicone polymer is allowed to impregnate the garment within the periphery of the die cavity and impregnation extends from the outside surface of the garment layer to a position near the inside surface of the garment layer. This impregnation forms a solid attachment of the silicone polymer to the garment at the same time that the design is formed by filling the design cavity of the injection molding die member with the silicone polymer.

The present invention provides an improved garment article and applique. The improved article includes a garment having a an outside surface for displaying a an applique, and an inside surface. A plurality of discrete, spaced apart polymer applique elements are affixed to and partially impregnate the garment at spaced apart positions.

A plurality of the elements have an outer flat surface, an inner flat surface, and a peripheral surface, the outer flat surface and peripheral surface intersecting at a crisp sharp edge portion.

Each element includes a portion of the polymer impregnating the garment in-between the garment inside and outside surfaces and over the surface area of each discrete element. The plurality of elements have a uniform thickness of between about 1.0 and 3.5 mm.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF TEE PREFERRED EMBODIMENT

Figure 1:
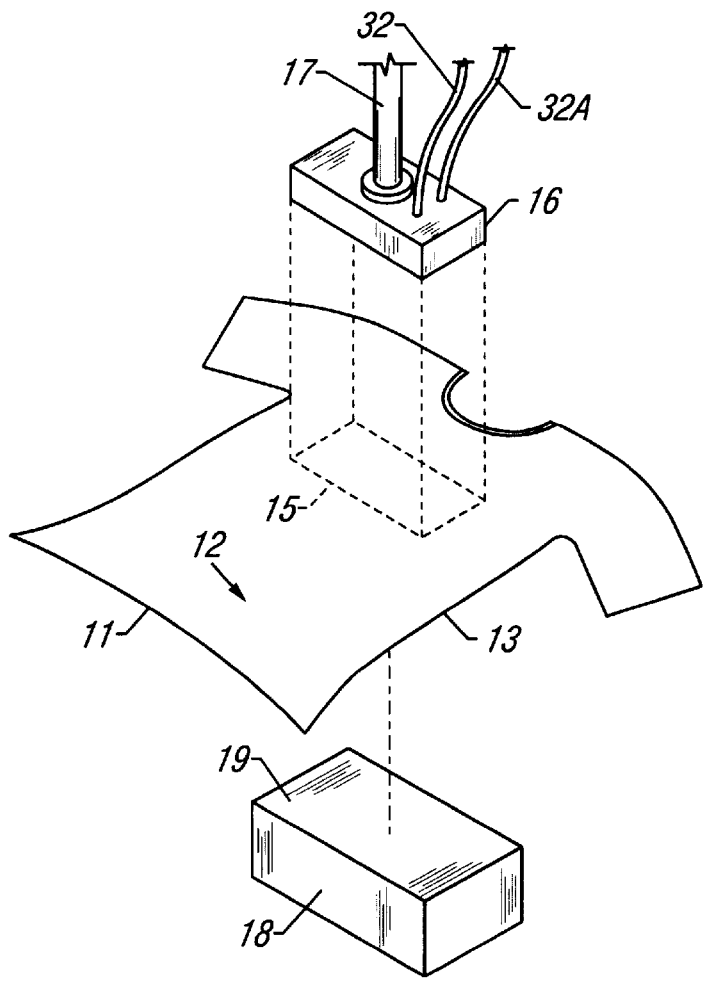
FIG. 1 is an exploded perspective view illustrating the method of the present invention, particularly the step of clamping the garment between an injection molding die member and backing plate member.
Figure 2:
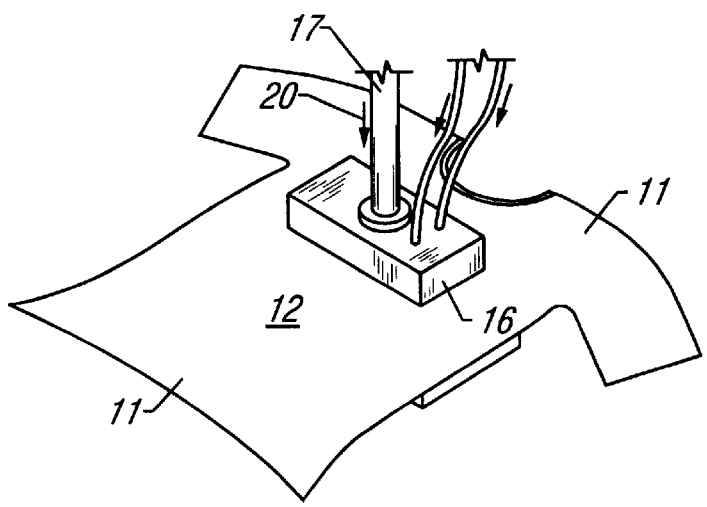
FIG. 2 is a perspective view illustrating the method of the present invention and particularly the step of injecting the polymer into the die cavity.
Figure 3:
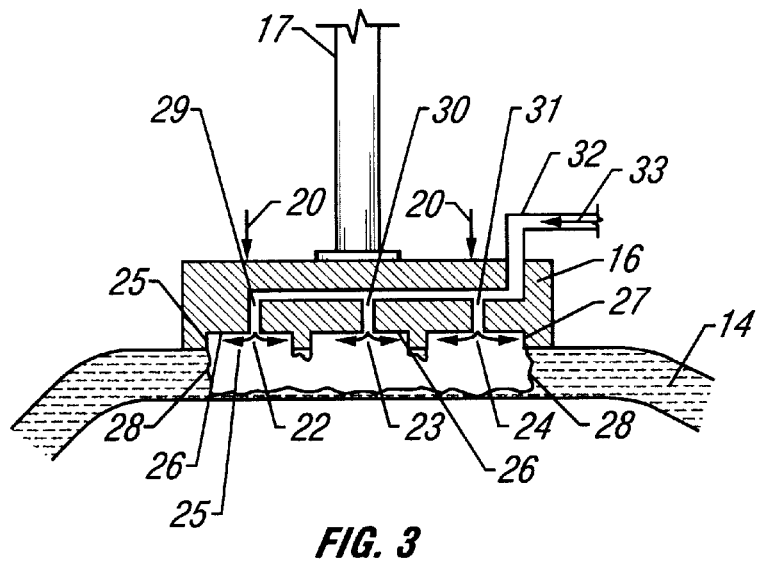
FIG. 3 is a sectional elevational view of the method of the present invention illustrating the impregnation of the garment with polymeric material and simultaneous forming of the applique.
Figure 4:
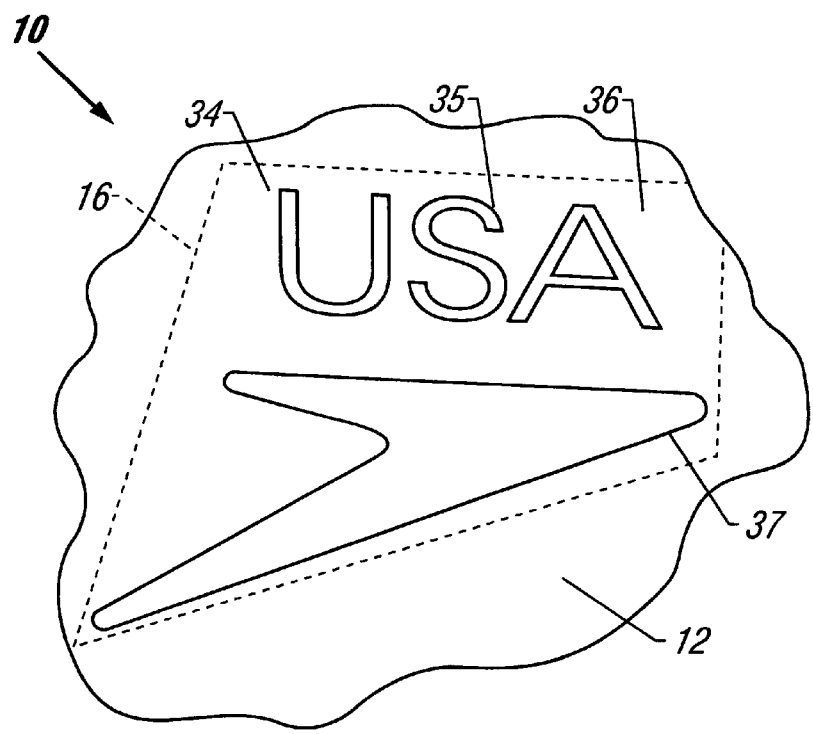
FIG. 4 is a frontal fragmentary view of the preferred article of the present invention.

In FIGS. 1–6, the method of the present invention is shown. The article 10 of the present invention is seen in FIG. 4 once the applique elements 34, 35, 36, and 37 have been attached to garment 11 upper surface 12. In FIG. 1, a pair of press members 16 and 18 are shown, positioned respectively above and below a selected garment 14. The garment 11 has an outer surface 12 that will receive the applique. The garment 11 has an inside surface 13 such as, for example, the opposing inside surface of the shirt 11. The backing press member 18 would simply be placed inside the shirt at the rear or inside surface of the shirt front panel. The shirt fabric layer 14 is being sandwiched in-between die press member 16 and backing plate press member 18. (see FIGS. 1–3).

As shown by the arrows 20 in FIG. 3, a pushrod 17 forces the die press member 16 into tight engagement with fabric layer 14 so that the fabric layer 14 is tightly gripped in-between the die press member 16 and the backing press member 18. This tight clamping is important because an injection moldable polymer such as silicone polymer or silicone rubber will be injected into the plurality of design element shaped cavities 22, 23, 24 of die press member 16 according to the method of the present invention. The backing plate press member 18 has an upper surface 19 that engages the inside surface 13 of garment 11. For purposes of illustration, the fabric layer 14 is shown as a thick layer in FIG. 3. However, it should be understood that a garment layer 14, such as on a T-shirt will typically be quite thin, usually no more than a few millimeters in thickness.

Die press member 16 carries three design element shaped cavities 22, 23, 24. Each cavity 22, 23, 24 is of a shape of a discrete design element that is to be attached to garment 11 surface 12. These discrete elements can be, for example, letters, numbers, artistic logos, graphical representations, or the like. As an example in FIG. 4, the discrete elements 34–37 are shown as including a plurality of letters 34, 35, 36 and a logo design 37.

The method of the present invention preferably utilizes an injection moldable polymer such as a silicone polymer that can be heated in die press member 16. In the method of the present invention, it is preferred that the mold 16 and injection moldable silicone polymer be heated to a temperature of about 200–250 degrees Fahrenheit (200° F.–250° F.). The injection moldable silicone polymer is transmitted from containers through a material flowline to a manifold, then to a static mix tube, then to another flowline and to the die member 16. Flowline 32 communicates with a plurality of conduits 29–31. Each conduit 29–31 communicates respectively with a die cavity 22–24. A second flowline 32a can be used to communicate to an additional die cavity such as, for example, a cavity that is shaped to conform to the logo 37. By using additional flowlines such as 32a, silicone polymer of a different color can be transmitted to the die cavity that corresponds to element 37 as compared to the color used for the elements 34, 35, and 36. As an example, the elements 34, 35, 36 can be of white injection molded silicone polymer. The logo design 37 could be, for example, red when the user prefers to place elements 34–37 on a navy blue T-shirt or sweatshirt. The arrow 33 in FIG. 3 schematically illustrates the flow of injection moldable silicone polymer through flowline 32 and to the various conduits 29–31 as shown.

Figure 5:
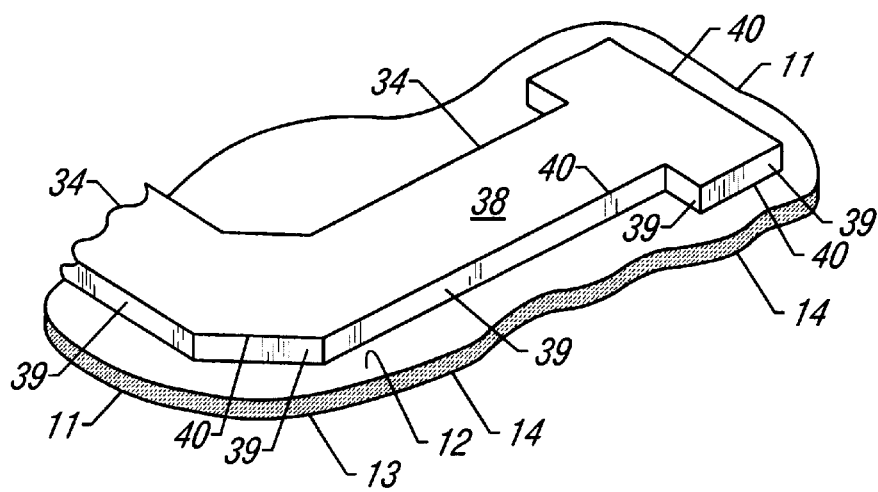
FIG. 5 is a perspective view of the preferred embodiment of the apparatus of the present invention.

In FIG. 5, one of the elements 34 is shown in more detail in perspective view. The element 34 has been attached to the upper surface 12 of garment 11. Because injection molding is used to form the element 34, it has a distinct shaped appearance that includes a flat upper surface 38, a flat peripheral surface 39, and a sharp edge 40 that is formed by the intersection of the flat upper surface 38 and the flat peripheral surface 39. An angle of about ninety degrees (90°) is formed between flat upper surface 38 and flat peripheral surface 39. The angle can be about ninety degrees (90°) or can be an obtuse angle of about ninety-one-one hundred degrees (91°–100°) for example. Each die cavity 22–24 has a shape that corresponds with a shape that corresponds with the shape of the elements 34, 35, 36, 37, to be formed. Therefore, each cavity 22–24 has surfaces 25, 26, 27 that define the shape such as the shape of element 34 in FIG. 5. Each cavity 22–24 has a peripheral surface 25, a flat upper surface 26 and a sharp edge surface portion 27.

Figure 6:
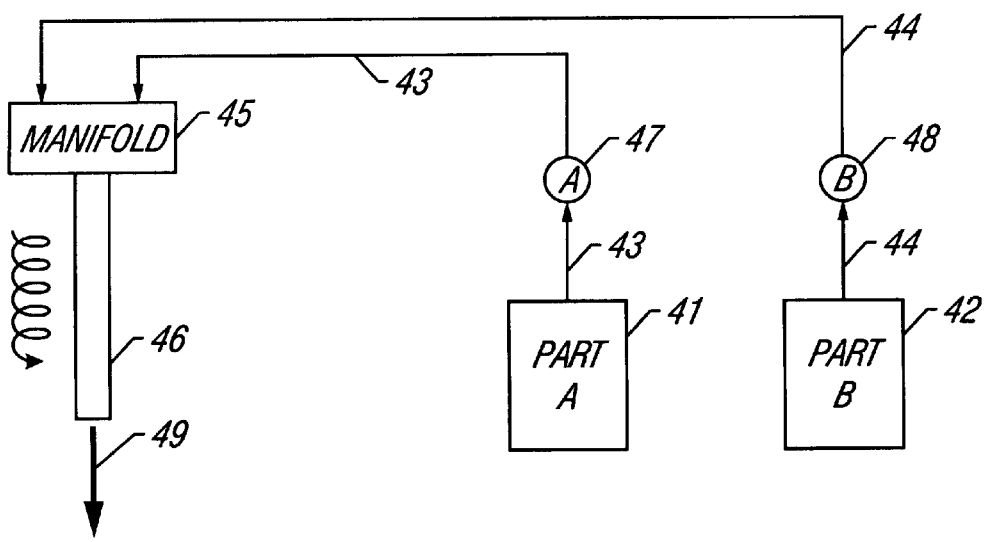
FIG. 6 is a block diagram illustrating part of the method of the present invention.

FIG. 6 is a schematic illustration of a part of the method of the present invention. In FIG. 6, a pair of vessels 41, 42 contained liquid silicone rubber parts that are to be mixed 50/50. The component parts of the liquid silicone rubber or silicone polymer are contained in the vessels 41, 42 and travel via flowlines 43, 44 to manifold 45. Pumps 47, 48 can be used for transmitting the liquid silicone rubber components contained in vessels 41, 42 via flowlines 43, 44 to manifold 45. Static mix tube 46 can be used to fully mix the components of the silicone liquid rubber that is to be injection molded to the garment 11. Arrow 49 in FIG. 6 indicates the transfer of mixed liquid silicone rubber from mixed tube 46 to flowline 32 or 32a that communicates with the die 16 and its design shaped die cavities 22, 23, 24. The heated silicone is injected into the die until the cavities 22–24 are filled and the garment layer 14 is impregnated with the silicone at the die open cavity area 28 (see FIG. 3. The silicone polymer is allowed to continuously impregnate the garment layer 14 at 28 within the periphery of the die from the outside surface 12 to a position near the inside surface 13.

The following table lists the parts numbers and parts descriptions as used herein and in the drawings attached hereto.

| PARTS LIST | |
| --- | --- |
| Part Number | Description |
| 10 | garment |
| 11 | clothing article |
| 12 | outer surface |
| 13 | inside surface |
| 14 | fabric layer |
| 15 | transfer area |
| 16 | die member |
| 17 | pushrod |
| 18 | backing member |
| 19 | upper surface |
| 20 | arrow |
| 21 | lower die surface |
| 22 | die cavity |
| 23 | die cavity |
| 24 | die cavity |
| 25 | peripheral surface |
| 26 | inside die surface |
| 27 | sharp edge |

PARTS LIST -continued

| Part Number | Description |
| --- | --- |
| 28 | impregnating polymer |
| 29 | conduit |
| 30 | conduit |
| 31 | conduit |
| 32 | flowline |
| 32A | flowline |
| 33 | arrow |
| 34 | discrete element |
| 35 | discrete element |
| 36 | discrete element |
| 37 | discrete element |
| 38 | flat upper surface |
| 39 | peripheral surface |
| 40 | sharp edge |
| 41 | vessel |
| 42 | vessel |
| 43 | flowline |
| 44 | flowline |
| 45 | manifold |
| 46 | static mix tube |
| 47 | pump |
| 48 | pump |
| 49 | arrow |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of molding a three dimensional body of polymeric materials onto substrates, comprising:

positioning and supporting a substrate having an inner surface and outer surface;

providing a supply of said polymeric materials;

applying a predetermined amount of said polymeric materials to a selected surface on said substrate to impregnate said substrate extending from said outer surface to a position near said inner surface and form a three dimensional body of said polymeric materials; and curing said polymeric materials applied to said selected surface on said substrate to form an attachment of said polymeric materials within pores of said substrate.

2. The method of claim 1, wherein said applying comprises injecting said supply of said polymeric materials into one or more mold cavities to form said three dimensional body of said polymeric materials onto said substrate.

3. The method of claim 1, wherein said curing comprises heating said three dimensional body on said substrate.

4. The method of claim 1, wherein said applying comprises forming a plurality of discrete spaced-apart three dimensional bodies comprised of said polymeric materials.

5. The method of claim 4, wherein said applying is performed substantially simultaneously.

6. The method of claim 1 wherein said providing a supply of said polymeric materials comprises:

providing a plurality of polymeric component materials; and mixing said polymeric component materials to form at least one of said polymeric materials.

7. A method of molding three dimensional bodies of polymeric materials onto substrates, comprising:

positioning and supporting a substrate having an inner surface and outer surface;

providing a plurality of polymeric component materials;

mixing said polymeric component materials to form at least one of said polymeric materials;

predetermining the amount of said polymeric materials to apply to said substrate;

injecting at least one of said polymeric materials into one or more mold cavities to form at least one of said three dimensional bodies onto said substrate;

permitting said polymeric materials to penetrate said substrate from said outer surface to a position near said inner surface; and heating said formed three dimensional bodies on said substrate to form an attachment of said polymeric materials to said substrate.

\* \* \* \* \*